United States Patent
Jeng

(10) Patent No.: US 8,295,309 B2
(45) Date of Patent: Oct. 23, 2012

(54) APPARATUS AND METHOD FOR TIME WEIGHTED BPSK CODE COMBINING

(75) Inventor: Isaac M. Jeng, Yorba Linda, CA (US)

(73) Assignee: The Boeing Company, Chicago, IL (US)

( * ) Notice: Subject to any disclaimer, the term of this patent is extended or adjusted under 35 U.S.C. 154(b) by 780 days.

(21) Appl. No.: 12/049,007

(22) Filed: Mar. 14, 2008

(65) Prior Publication Data

US 2009/0232164 A1    Sep. 17, 2009

(51) Int. Cl.
*H04J 3/00* (2006.01)
(52) U.S. Cl. ......................................... 370/498
(58) Field of Classification Search ........... 375/329–336
See application file for complete search history.

(56) References Cited

U.S. PATENT DOCUMENTS

| 7,154,962 B2 * | 12/2006 | Cangiani et al. | 375/295 |
| 2002/0150068 A1 * | 10/2002 | Orr et al. | 370/335 |

OTHER PUBLICATIONS

Spilker, James J., Jr., Orr, Richard S. "Code Multiplexing via Majority Logic for GPS Modernization," ION GPS-98; Proceedings of the 11th International Technical Meeting of the Satellite Division of the Institute of Navigation, Nashville, TN, Pt. 1; United States; Sep. 15-18, 1998. pp. 265-273.

* cited by examiner

*Primary Examiner* — Anh-Vu Ly
*Assistant Examiner* — Maharishi Khirodhar
(74) *Attorney, Agent, or Firm* — Harness, Dickey & Pierce, P.L.C.

(57) ABSTRACT

A method for time weighted combining of a plurality of binary phase shift key (BPSK) code sequences that is implemented by providing first, second and third sequences of chips of a BPSK code having a first, second and third code powers, respectively. A majority vote (MV) sequence of chips from the first, second and third sequences of chips is determined and a time multiplexed composite BPSK composite code sequence is formed by selecting a specific number of samples from each of the MV sequence of chips, and the two sequences of chips of the first, second and third sequences of chips that have the highest code powers, to form samples in a unit duration.

20 Claims, 10 Drawing Sheets

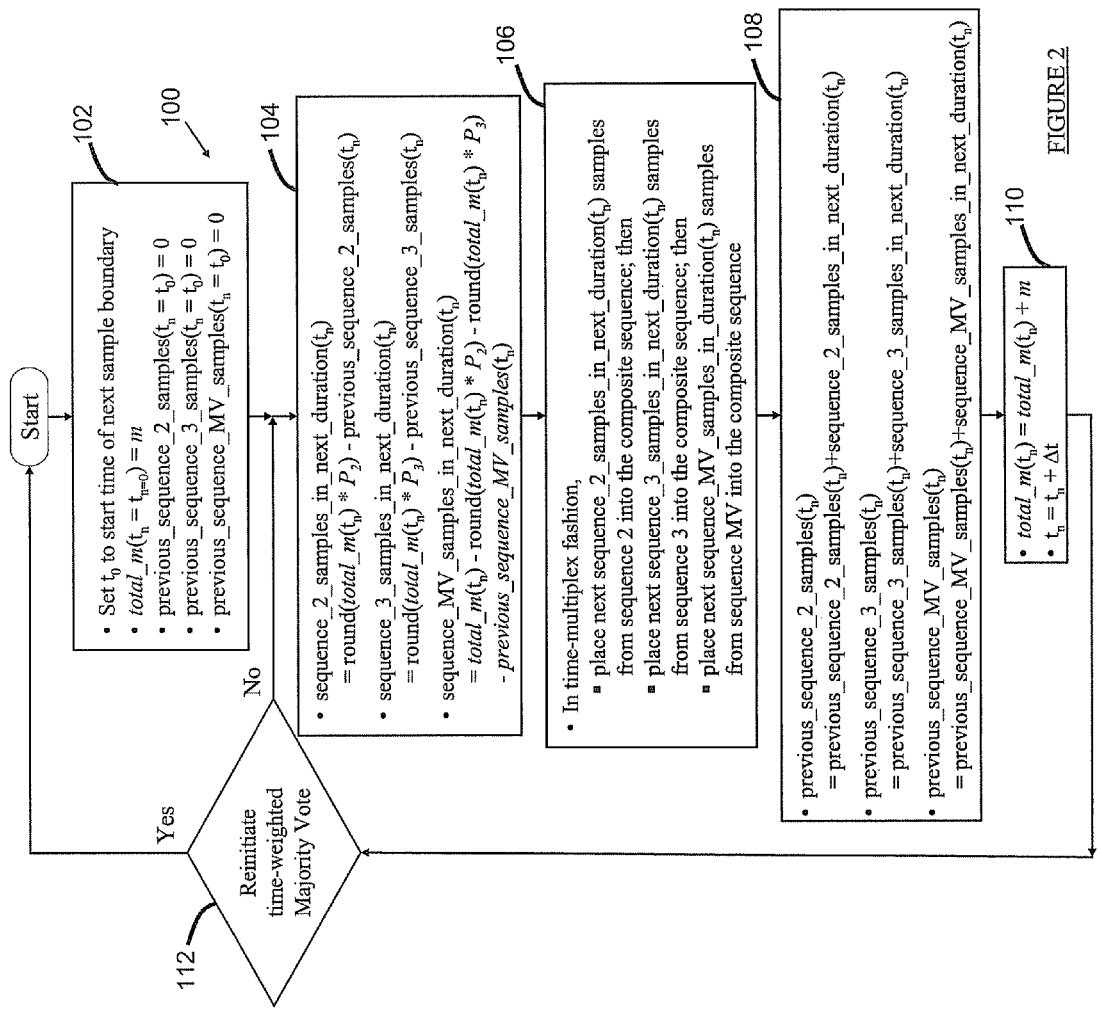

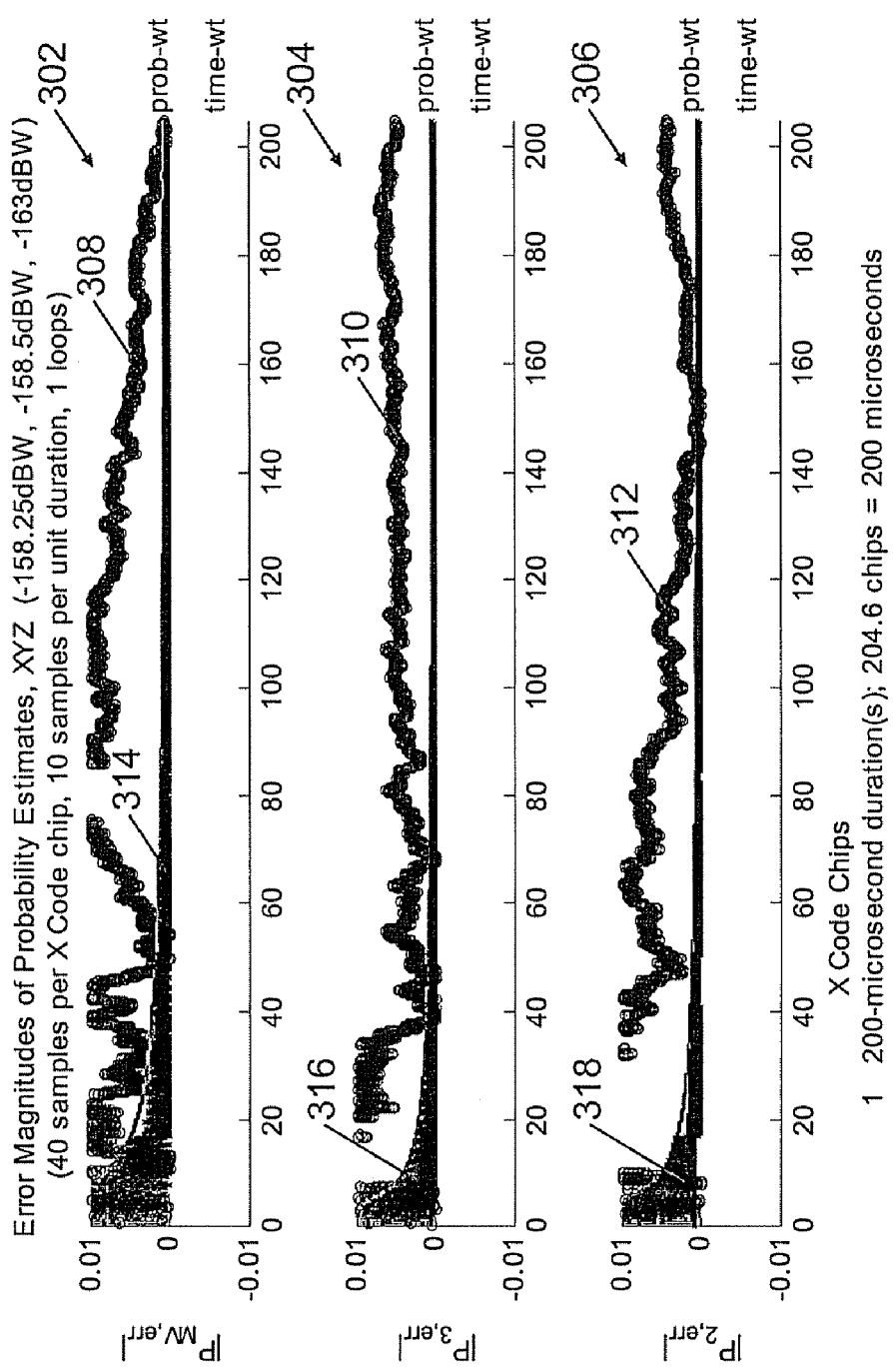

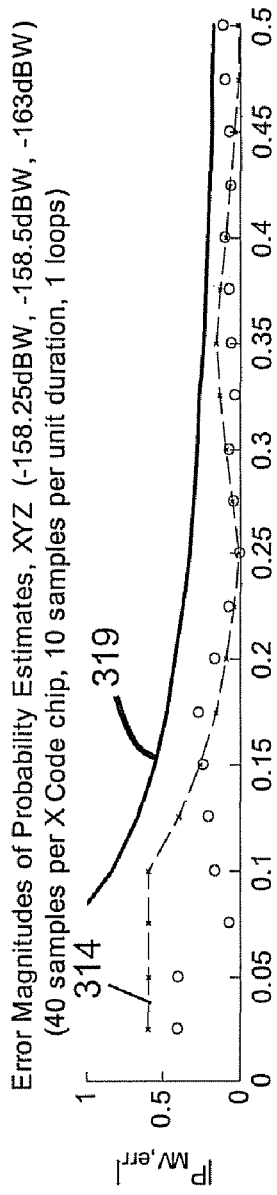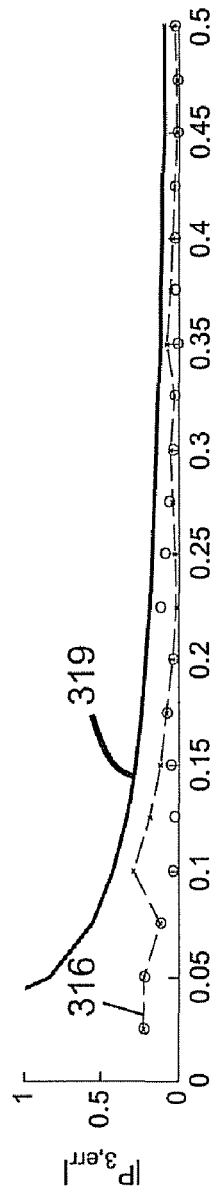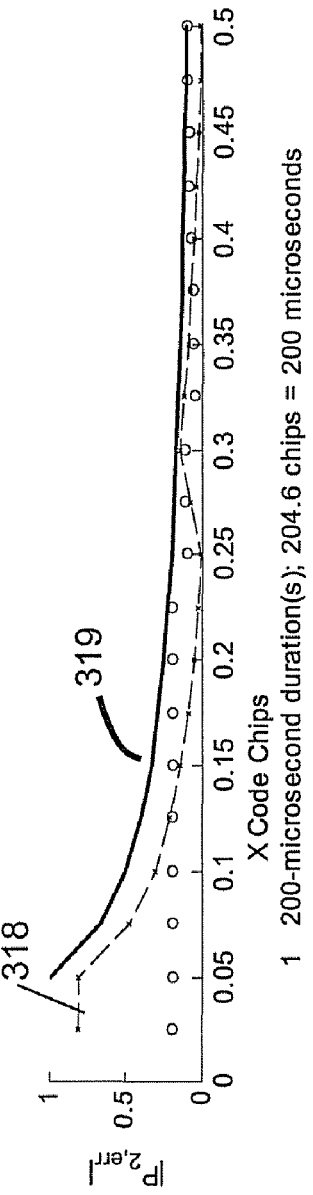
FIGURE 5A
FIGURE 5B
FIGURE 5C

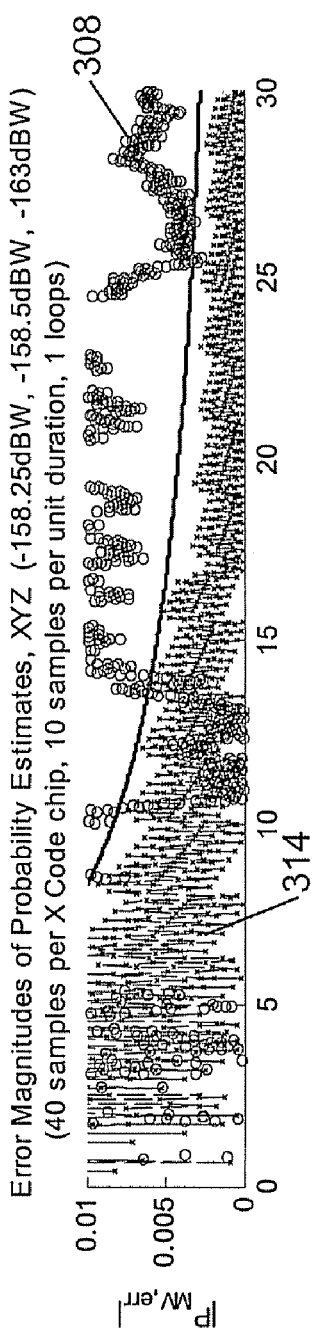
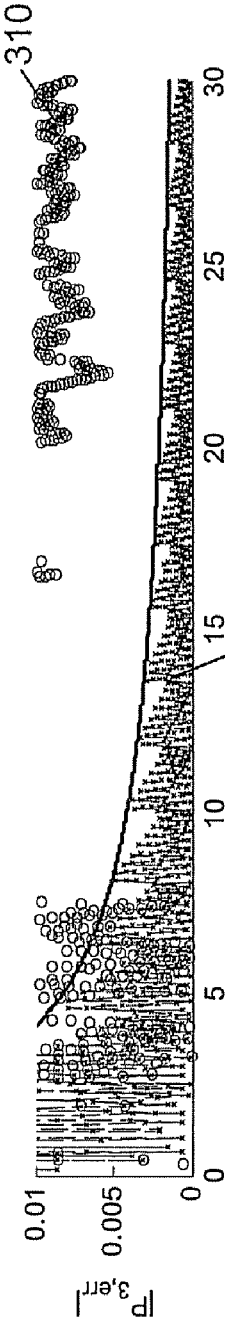
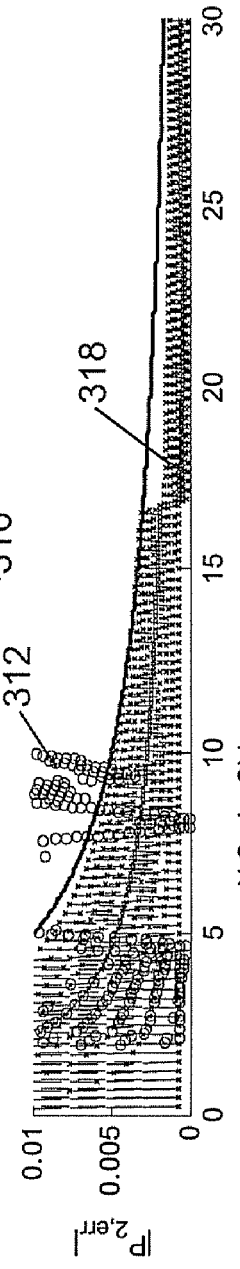
FIGURE 6A
FIGURE 6B
FIGURE 6C

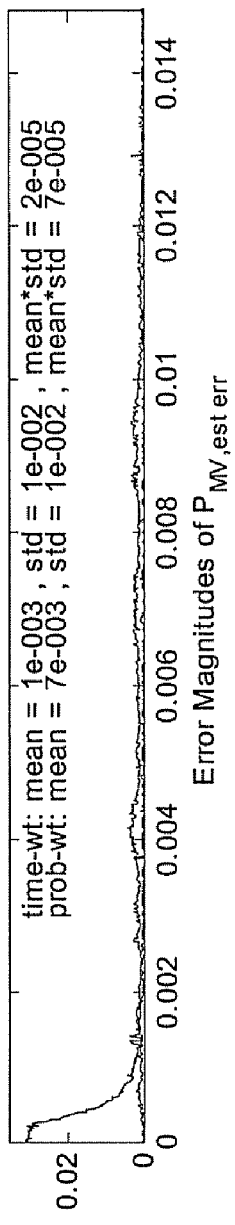
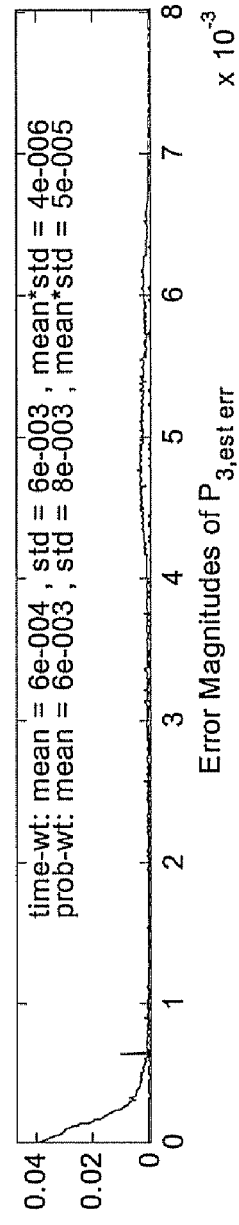
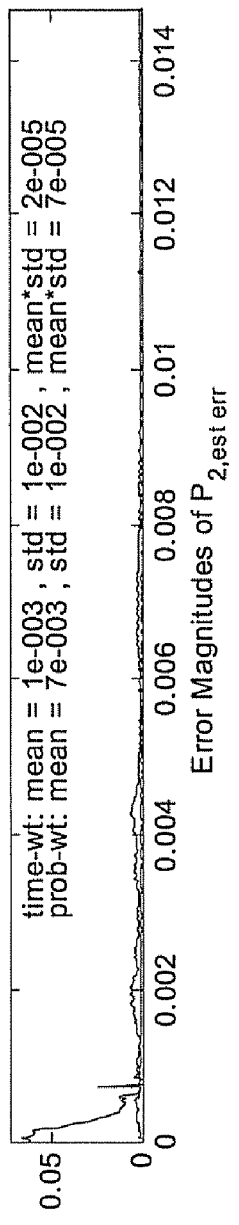
FIGURE 7A
FIGURE 7B
FIGURE 7C

APPARATUS AND METHOD FOR TIME WEIGHTED BPSK CODE COMBINING

STATEMENT OF GOVERNMENT RIGHTS

This invention was made with Government support under FA8807-04-C-0002 awarded by the Air Force. The government has certain rights in this invention.

Please renumber the remaining Paragraphs of the specification as noted below:

FIELD

The present disclosure relates to systems and methods for combining binary phase shift key (BPSK) codes, and more particularly to an apparatus and method for combining a plurality of BPSK codes using time weighting.

BACKGROUND

The statements in this section merely provide background information related to the present disclosure and may not constitute prior art.

Currently the Global Positioning System (GPS) IIF transmits exactly 3 binary phase shift key (BPSK) codes using Interplex modulation such that the transmitted signal has a constant power. GPS III needs to transmit 2 additional BPSK codes. However, it is strongly desired that the transmitted signal still should have a constant power. Hence, these two additional codes need to be combined with the 3 original BPSK codes via some intermediate code combining technique, then modulated by the Interplex method such that the transmitted signal still maintains a constant power.

There are no satisfactory existing solutions to the problem of combining the 2 additional BPSK codes transmitted by GPS III and the 3 BPSK codes transmitted by GPS IIF. One attempt to overcome this challenge has involved the use of Interlace combining followed with Interplex phase modulation. However, the existing Interlace combining technique requires the use of a uniform random number generator. The optimality of the Interlace combining technique depends on the authenticity of the uniform random number generator (i.e., how uniformly distributed are the random numbers generated by it within a short duration) and its authenticity period (i.e., the duration it takes to achieve that uniform distribution). If these are not met, the backward compatibility requirement (the most foremost requirement) of GPS III in terms of existing shortest receiver integration time cannot be met adequately and the combined transmitted code will not be fully compatible with the existing GPS receivers in the world.

SUMMARY

A method is disclosed for time weighted combining of a plurality of binary phase shift key (BPSK) code sequences. The method may comprise providing a first sequence of chips of a BPSK code having a first code power; providing a second sequence of chips of a BPSK code having a second code power; providing a third sequence of chips of a BPSK code having a third code power; and determining a majority vote (MV) sequence of samples from the first, second and third sequences of samples of chips. Choosing two sequences of the two highest code powers among the first, second and third sequences and this MV sequence as the component sequences, a time multiplexed composite BPSK code sequence is formed by selecting a specific number of samples from these three component sequences, to form samples in a unit duration, with the specific numbers of samples selected from each of the MV sequence and the two sequences of chips having the highest code powers being representative of the probabilities of each of the sequences being randomly selected based on their respective gains.

In another implementation a method for time weighted combining of a plurality of three binary phase shift key (BPSK) codes sequences is disclosed. The method may comprise:

providing a first sequence of chips of a BPSK code having a first code power;

providing a second sequence of chips of a BPSK code having a second code power;

providing a third sequence of chips of a BPSK code having a third code power;

determining a majority vote (MV) sequence of chips from the first, second and third sequences of chips;

forming a time multiplexed composite BPSK composite code sequence by selecting a specific number of samples from each of the MV sequence of chips, and the two sequences of chips of the first, second and third sequences of chips that have the highest code powers, to form samples in a unit duration, with the specific numbers of samples selected from each of the MV sequence and the two sequences of chips having the highest code powers being representative of the probabilities of each of the sequences being randomly selected based on their respective gains; and the probability ($P_{MV}$) of samples from each of the MV sequence, and the probability ($P_3$) of samples from the sequence having the highest code power, and the probability ($P_2$) of samples from the sequence having the second highest code power, being selected are represented by the following formulas:

$$P_{MV} = \frac{2}{\sqrt{G_3} + \sqrt{G_2}} \quad \text{(eq-1)}$$

$$P_3 = \frac{\sqrt{G_3} - 1}{\sqrt{G_3} + \sqrt{G_2}} \quad \text{(eq-2)}$$

$$P_2 = \frac{\sqrt{G_2} - 1}{\sqrt{G_3} + \sqrt{G_2}} \quad \text{(eq-3)}$$

where $G3 \geq G2$.

In another aspect an apparatus is disclosed for performing a direct rounding operation to time multiplex combine a plurality of binary phase shift key (BPSK) code sequences to obtain a series of unit durations, wherein the series of unit durations represents an overall time multiplexed BPSK code sequence, and wherein the BPSK code sequences include a first sequence of chips of a BPSK code having a first code power, a second sequence of chips (sequence 2) of a BPSK code having a second code power, a third sequence of chips (sequence 3) of a BPSK code having a third code power, and a majority vote (MV) sequence of chips determined from the first, second and third sequences of chips; the apparatus comprising:

a first accumulator (accumulator MV) for counting a number of code samples selected from the MV sequence in all preceding unit durations;

a second accumulator (accumulator 2) for counting a number of samples obtained from the sequence 2 in all preceding unit durations;

a third accumulator (accumulator 3) for counting a number of samples from the sequence 3 in all preceding unit durations;

a first rounding operator for computing $s_2$, which represents a total number of samples contributed from the sequence 2 to be placed in an immediate subsequent unit duration and those samples from the sequence 2 that have been placed in all preceding unit durations;

a second rounding operator for computing $s_3$, which represents a total number of samples contributed from the sequence 3 to be placed in the immediate subsequent unit duration and those samples from the sequence 3 that have been placed in all the preceding unit durations;

a summing device for taking the count of all of the samples in all of the unit durations determined hitherto, subtracting the number of the sequence 2 samples placed in said all the unit durations determined hitherto, subtracting the number of the sequence 3 samples placed in all of the unit durations determined hitherto, subtracting the number of sequence MV samples placed in all of the unit durations determined hitherto except the most immediate subsequent unit duration, to produce a count $s_{MV}$ of MV sequence samples to be placed in the subsequent unit duration;

a time multiplexing logic subsystem adapted to select a number of samples from each of the MV sequence, the sequence 2 and the sequence 3, in accordance with the count $s_{MV}$ of the MV sequence samples, the count $s_2$ of sequence 2 samples and the count $s_3$ of sequence 3 samples.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2 is a flowchart illustrating operations performed in accordance with the methodology of the present disclosure;

FIGS. 4A to 4C are graphs of error magnitudes of probability estimates for both the conventional probability weighted approach and the time weighted approach of the present disclosure;

FIGS. 5A-5C show zoomed in portions of error magnitudes of time weighted approach and their upper error bounds of the graphs of FIGS. 4A-4C respectively;

FIGS. 6A-6C show zoomed in error magnitudes of probability weighted estimates for the curves of FIGS. 4A-4C;

FIGS. 7A-7C show the probability density function (PDF) of error magnitudes of probability estimates for both the probability weighted approach and the time weighted approach of the present disclosure, at 10 samples per unit duration;

DETAILED DESCRIPTION

The following description is merely exemplary in nature and is not intended to limit the present disclosure, application, or uses.

Figure 1:
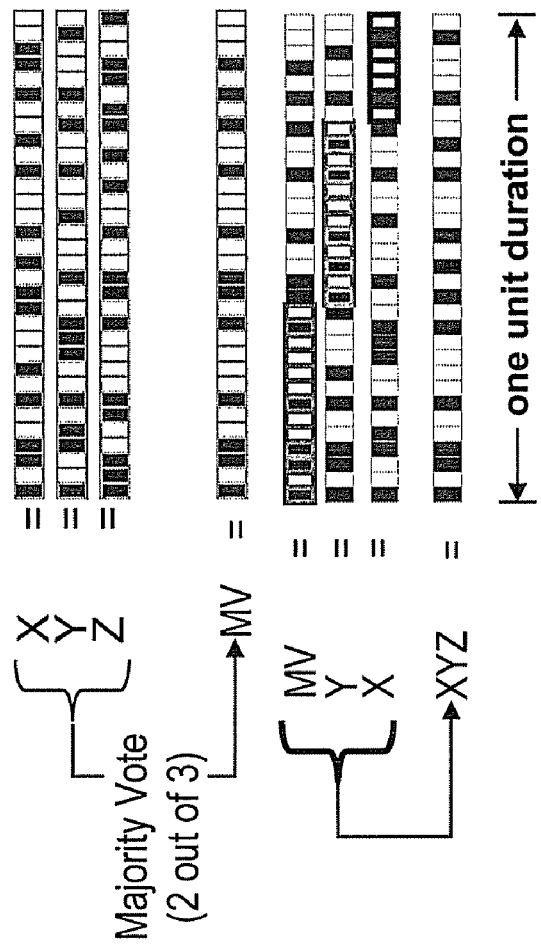
FIG. 1 is series of diagrams of a plurality of code chips to illustrate the formation of a time weighted composite BPSK code, of one unit duration, in accordance with the methodology of the present disclosure.

Referring to FIG. 1, there is shown a series of chips that represent a plurality of distinct code sequences, to illustrate a methodology of the present disclosure in forming a time weighted composite BPSK code ("XYZ"). Three separate codes sequences labeled "X", "Y" and "Z" are each formed from a plurality of code chips. The three separate code sequences X, Y and Z, the three component sequences, are combined into one code using the well known "majority vote" method, to produce a composite code sequence "MV" (hereinafter the "sequence MV"). By the majority vote method, the chip in a given time slot in the MV sequence is placed by the chip of at least two, if not all three, like chips among the three component sequences in the same time slot.

The time weighted methodology described herein uses the MV sequence and the two highest code power sequences, which throughout the following discussion will be denoted by the terms "sequence 2" and "sequence 3", where sequence 3 is the code sequence having the highest code power, and sequence 2 is the sequence having the next highest code power. This example also assumes that code sequences Y and X are the sequence 3 and sequence 2, respectively.

The probability of a sample in a chip being selected as a sample from any one of the sequence MV, the sequence 3 or the sequence 2 can be expressed by the probabilities:

$$P_{MV} = \frac{2}{\sqrt{G_3} + \sqrt{G_2}} \quad \text{(eq-4)}$$

$$P_3 = \frac{\sqrt{G_3} - 1}{\sqrt{G_3} + \sqrt{G_2}} \quad \text{(eq-5)}$$

$$P_2 = \frac{\sqrt{G_2} - 1}{\sqrt{G_3} + \sqrt{G_2}} \quad \text{(eq-6)}$$

$$P_{MV} + P_3 + P_2 = \frac{2 + \sqrt{G_3} - 1 + \sqrt{G_2} - 1}{\sqrt{G_3} + \sqrt{G_2}} \quad \text{(eq-7)}$$
$$= 1$$

and $$G_3 = \frac{\max(PWR_{C/A}, PWR_{L1Cp}, PWR_{L1Cd})}{\min(PWR_{C/A}, PWR_{L1Cp}, PWR_{L1Cd})} \quad \text{(eq-8)}$$
$$= \frac{PWR_{L1Cp}}{PWR_{L1Cd}}$$

-continued $$G_2 = \frac{mid(PWR_{C/A}, PWR_{L1Cp}, PWR_{L1Cd})}{min(PWR_{C/A}, PWR_{L1Cp}, PWR_{L1Cd})} \quad \text{(eq-9)}$$
$$= \frac{PWR_{C/A}}{PWR_{L1Cd}}$$

where "PWR" is power of a BPSK code or also known as power of a BPSK sequence;

where "$G_3$" is the ratio of power of the highest power sequence to that of the lowest power sequence; and where "$G_2$" is the ratio of power of the second highest power sequence to that of the lowest power sequence.

Figure 1A:
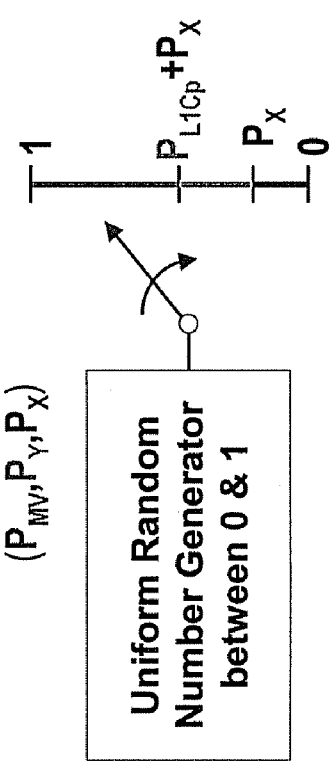
FIG. 1A is a high level diagram of a prior art of Uniform Random Number Generator that randomly generates a specific number, between 0 and 1, in conjunction of forming a composite code sequence.

In previously developed systems, it will be appreciated that a random number from a uniform random number generator (URNG) has been used to select the chips that are used to make up the composite code from the MV, Y and X codes. A mapping table has been used to map the selected chips to form the composite code. With a random number generator, the numbers generated will be distributed generally uniformly between 0 and 1. The probability of a random number having the value in one of the three intervals (e.g., [0 to $P_x$], [$P_x$ to $P_x+P_y$] and [$P_x+P_y$ to $1=P_x+P_y+P_{MV}$]; as indicated in prior art FIG. 1A) is, respectively, $P_x$, $P_y$ or $P_{MV}$. Hence, the percentages of chips of the composite code sequence that are selected from the X, Y or MV sequences are, respectively, $P_x$, $P_y$ or $P_{MV}$.

When a random number falls in the first interval [0 to $P_x$], the current chip of the first sequence, the X sequence, is used as the current chip of the composite sequence. When the random number falls in the second interval [$P_x$ to $P_x+P_y$], the current chip of the second sequence, the Y sequence, is used as the current chip of the composite sequence, and so on. This process is repeated once every chip time. The mapping table maps the current chip from the sequence that is associated with the interval within which the random number falls into to the composite sequence. This scheme depends greatly on the authenticity (i.e., the flatness of the uniform distribution) and the authenticity period (e.g. the time duration to establish such flatness) of the URNG. These requirements are needed to guarantee that a required number of chips from each sequence is received by a receiver within that time duration.

The time-weighted Majority Vote combining methodology of the present disclosure, however, is able to achieve the same objectives without using a URNG. Since equations (eq-1), (eq-2) and (eq-3) are used to determine the amounts of samples in a unit duration from the three component sequences, the operations for the time-weighted Majority Vote combining may be expressed generally as:

form the composite sequence by mapping appropriate amounts of samples from the three component sequences to the composite sequence without a URNG;

select the amount of samples from each of the three component sequences (i.e., the MV sequence; the sequence 3 (Y), and the sequence 2 (X) sequence) so that equations (eq-1), (eq-2) and (eq-3) are all satisfied; and repeatedly perform the above two operations for each unit duration, (for example 0.2444 microseconds, a portion of X code chip duration) while maintaining minimum errors to the estimates of (eq-1), (eq-2) and (eq-3) (e.g. much shorter than the shortest correlation integration time in any existing GPS receiver, which is for the backward compatibility requirement).

With further reference to FIG. 1, the above operations will be further explained. The terminology "one unit duration" represents a duration at the end of which the ratio of chip samples from the three component sequences (sequence MV, sequence 3 and sequence 2) versus the total amount of samples in the duration satisfies equations (eq-1), (eq-2) and (eq-3) with errors no more than ±0.5 samples. The following will show that the time-weighted Majority Vote methodology, and its use of a direct rounding algorithm, operates even more favorably than the probability-weighted Majority Vote methodology and is even less complex in its implementation. The time-weighted Majority Vote methodology does not require the use of a URNG, provides excellent authenticity and a short authenticity period. The later two metrics are metrics that may be used to compare the performance of the probability-weighted and time-weighted (i.e., direct rounding algorithm) approaches. Authenticity essentially means how flat the probability density function (PDF) is formed by the numbers generated by the URNG over time. The authenticity period represents how long of a time period that it takes for the URNG to achieve that desired degree of flatness. These two metrics can be described in another way. That is, the authenticity of a URNG is shown by the error magnitudes (not errors, but error magnitudes) of the estimates of PMV, P3 and P2. The smaller the error magnitudes the more authentic the URNG is. In addition, the authenticity period is how long (e.g. how many samples) the URNG takes for the error magnitudes to be smaller than some predetermined thresholds.

Before proceeding with the comparison between the effectiveness of the conventional probability-weighted approach and time-weighted Majority Vote (using the direct rounding algorithm) approach, certain implementation detail definitions will be helpful. The "composite sequence" is defined as the sequence that is to be transmitted. The samples (not chips) in the composite sequence are samples of chips obtained from the three component sequences (i.e., the MV sequence, the sequence 2 and the sequence 3) in a time-multiplexed fashion. In the sense of time, the composite sequence is formed by concatenating a series of unit durations. In the composite code, there is also a slight difference between the formation of the samples in the first unit duration and the formation of the samples in all subsequent unit durations. The number of samples contributed from the three component sequences (MV, sequence 2 and sequence 3) into the first unit duration are as follows (m is number of samples in each unit duration):

$$\text{total}\_m = m = \text{number of samples in the 1}^{st}\text{ unit duration(starting } t_0) \quad \text{(eq-10)}$$

$$\text{round}(m \times P_2) = \text{number of samples contributed from sequence 2(the code sequence of the second highest code power)} \quad \text{(eq-11)}$$

$$\text{round}(m \times P_3) = \text{number of samples contributed from sequence 3(the code sequence having the highest code power)} \quad \text{(eq-12)}$$

$$m - \text{round}(m \times P_2) - \text{round}(m \times P_3) = \text{number of samples contributed from the MV sequence} \quad \text{(eq-13)}$$

The numbers of samples contributed from the three component sequences into each subsequent unit duration are as follows:

$$\text{total}\_m = \text{total}\_m + m = \text{Total number of samples in all unit durations since } t_0 \text{ including the next unit duration;} \quad \text{(eq-14)}$$

$$\text{round}(\text{total}\_m \times P_2) - \text{samples from sequence 2 in all previous unit durations} = \text{number of samples contributed from sequence 2 into the next unit duration;} \quad \text{(eq-15)}$$

$$\text{round}(\text{total}\_m \times P_3) - \text{samples from sequence 3 in all previous unit durations} = \text{number of samples contributed from sequence 3 into the next unit duration;} \quad \text{(eq-16)}$$

total_$m$−round(total_$m \times P_2$)−round(total_$m \times P_3$)−
samples from MV sequence in all previous unit
durations=number of samples contributed from
MV sequence into the next unit duration;  (eq-17)

and wherein said first unit duration=total_$m$,=initialized to m.

For the first unit duration, total_$m$ is initialized to m. Thereafter, total_$m$ is incremented by m at the start of each unit duration:

$$\text{total}\_m = \text{total}\_m + m \quad \text{(eq-18)}$$

Based on the immediate 9 equations above, the estimate of the probability of selecting a sample from any one of the three component sequences, within a given duration starting from $t_0$, performed by the direct rounding algorithm may be computed as follows:

$$P_{MV,est} = \frac{\text{number of samples in the given duration starting from } t_0 \text{ contributed from the MV sequence}}{\text{total number of samples within the same given duration}} \quad \text{(eq-19)}$$

$$P_{3,est} = \frac{\text{number of samples in the given duration starting from } t_0 \text{ contributed from sequence 3}}{\text{total number of samples within the same given duration}} \quad \text{(eq-20)}$$

$$P_{2,est} = \frac{\text{number of samples in the given duration starting from } t_0 \text{ contributed from sequence 2}}{\text{total number of samples within the same given duration}} \quad \text{(eq-21)}$$

Since the direct rounding approach provides just the estimates of these probabilities, there may still be extremely minor probability estimation errors, and any such errors may be defined by the formulas:

$$P_{MV,err} = \frac{\text{number of samples in the given duration starting from } t_0 \text{ contributed from the MV sequence}}{\text{total number of samples within the same given duration}} - P_{MV} \quad \text{(eq-22)}$$

$$P_{3,err} = \frac{\text{number of samples in the given duration starting from } t_0 \text{ contributed from sequence 3}}{\text{total number of samples within the same given duration}} - P_3 \quad \text{(eq-23)}$$

$$P_{2,err} = \frac{\text{number of samples in the given duration starting from } t_0 \text{ contributed from sequence 2}}{\text{total number of samples within the same given duration}} - P_2 \quad \text{(eq-24)}$$

However, the same error calculations would apply to the conventional probability-weighted approach that requires a URNG. The errors $P_{MV,err}$, $P_{3,err}$ and $P_{2,err}$ are useful parameters. They give the effectiveness comparison (e.g. two metrics: the authenticity and the authenticity period) between the conventional probability-weighted approach and the time-weighted Majority Vote approach of the present disclosure.

Referring to FIG. 2, a flowchart 100 summarizing the direct rounding methodology described above is shown. At operation 102 the start time of the next sample boundary is set, where at this point $t_0$ will represent the start time of the first unit duration. The previous total number of samples selected from the MV sequence will be 0, the previous total number of samples selected from the sequence 2 will be 0, and the previous total number of samples selected from the sequence 3 will also be 0.

At operation 104, the number of samples to be selected from the MV sequence, sequence 2 and sequence 3 for the next unit duration are determined. Equation (eq-15) is used to determine $s_2$ the number of samples that will be selected from the sequence 2 for the next (i.e., subsequent) unit duration; equation (eq-16) is used to determine $s_3$ the number of samples that will be selected from the sequence 3 for the next unit duration; and equation (eq-17) is used to determine $s_{MV}$ the number of samples to be selected from the MV sequence for the next unit duration.

At operation 106, $s_2$ samples from sequence 2, followed by $s_3$ samples from sequence 3 then followed by $s_{MV}$ samples from the MV sequence are placed sequentially in the next unit duration of the composite sequence (i.e., the time weighted Majority Vote sequence being formed).

At operation 108, a count of all of the previous sequence 2 samples used in all the preceding unit durations is added to $s_2$ the number of sequence 2 samples that will be used in the next unit duration, to produce an updated count number for the total number of sequence 2 samples used. The same operation is performed for the sequence 3 and MV sequence counts.

At operation 110, the total number of samples (total_m($t_n$)) is updated with the total number of samples to be used as of the end of the next unit duration. Operation 112 checks if the component sequences are to be re-initialized, such as if the previous string of sequences has been completed and an entirely new code combining operation is to be started. If the answer at this inquiry is "yes", then the start time for $t_0$ is re-initialized, and the sample counts for the component sequences are reinitialized. Otherwise, the flowchart 100 continues with operation 102.

Figure 3:
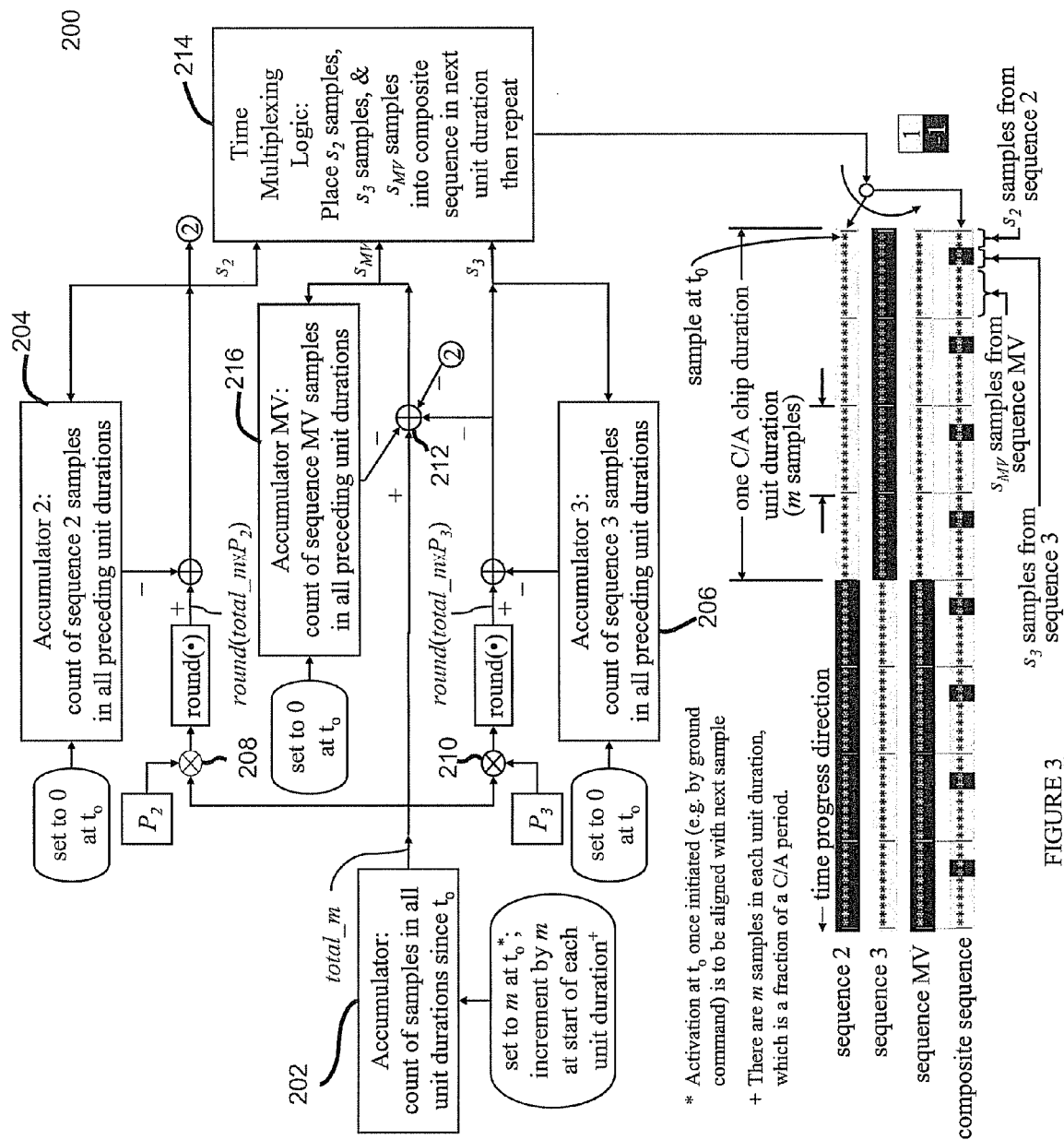
FIG. 3 is a high level block diagram of an exemplary implementation of an apparatus for performing the rounding and summing operations in determining the number of samples from each of three component code sequences to be used in selecting the samples for a subsequent unit duration.

Referring to FIG. 3, a system 200 is shown for implementing the rounding functions performed by the methodology of the present disclosure. The system 200 makes use of a first accumulator 202 for counting all the samples in all unit durations since $t_0$. A second accumulator 204 is used for counting the number of sequence 2 samples used in all preceding unit durations. A third accumulator 206 is used for counting the number of sequence 3 samples used in all preceding unit durations. A fourth accumulator is used for counting the number of MV sequence samples used in all preceding unit durations. Multiplier circuit 208 performs multiplication of total_m and $P_2$, the rounding operation downstream performs rounding on the product from circuit 208 to produce the total number of sequence 2 samples in all preceding unit durations and the next unit duration. The summing junction downstream subtracts the accumulator 204 output from this rounded number to determine $s_2$ the exact number of sequence 2 samples to be placed in forming the time-weighted composite sequence for the next unit duration. Multiplier circuit 210 performs multiplication of total_m and $P_3$, the rounding operation downstream performs rounding on the product from circuit 210 to produce the total sequence 3 samples in all preceding unit durations and the next unit duration. The summing junction downstream subtracts accumulator 206 output from this rounded number to determine $s_3$ the exact number of sequence 3 samples to be placed in forming the time-weighted composite sequence in the next unit duration.

A summing component 212 determines $s_{MV}$ the number of MV sequence samples to be placed in the next unit duration by subtracting from the accumulator 202 output the numbers of sequence 2 and sequence 3 samples in all preceding unit durations and the next duration as well as the MV sequence samples in all preceding unit durations. A time multiplexing subsystem 214 time multiplexes the selected numbers of samples from each of the MV sequence, sequence 2 and sequence 3 to construct the time weighted composite sequence for the next unit duration.

FIGS. 4A-4C show various performance comparisons between the conventional probability weighted approach and the time weighted approach of the present disclosure. Referring to FIGS. 4A-4C, the error magnitudes $|P_{MV,err}|$, $|P_{3,err}|$ and $|P_{2,err}|$, are shown in FIGS. 4A-4C, respectively. The curves 308, 310 and 312 are for probability-weighted approach. The curves 314, 316 and 318 are for the time-weighted approach. There are several characteristics that may be noted. The error magnitude curves of probability-weighted approach (curves 308, 310 and 312) are random and the ones of the time-weighted approach 314, 316 and 318 are deterministic. Furthermore, the errors exhibited by the time weighted approach (curves 314, 316 and 318) are much smaller than those indicated by the probability-weighted approach (curves 308, 310 and 312). Also, both sets of error curves converge to zero and the time-weighted ones converge much faster, i.e., in a deterministic fashion, and are upper bounded. FIGS. 5A-5C are zoomed in depictions of comparative portions of the curves shown in FIGS. 4A-4C, respectively, during the span of the first two unit durations. As noted earlier, sequence 3 is the sequence of the highest code power −152.25 dBW. Sequence 2 is the sequence of the second highest code power −158.50 dBW. Hence, FIG. 5B shows the error magnitudes of (eq-23) using both probability weighted approach and the time weighted approach. The error magnitudes at any sample times for probability weighed approach are shown as circles. The error magnitudes at any sample times for time weighted approach are shown as x's and are upper bounded by the heavy line 319. FIGS. 5A and 5C show the corresponding error magnitudes for the MV sequence and for sequence 2. It is apparent that all the error magnitudes for the probability weighted approach are random; the error magnitudes for the time weighted approach are deterministic and are upper bounded. FIGS. 6A-6C show another zoomed in views of the curves of FIGS. 4A-4C over the span of 30 X code chips. The sampling rate is 40 samples per X code chip and the unit duration has the time length of 10 samples. 40 samples per X code chip means 4 chips per P chip. This sampling rate is fast enough to sample P code without any aliasing problem. The probability-weighted curves show the characteristics of the URNG. These characteristics have to do with how the URNG is constructed and its initialization seed. It shows how uniformly distributed it is within the given duration (e.g. how long it takes to achieve zero for $P_{MV,err}$, $P_{3,err}$, $P_{2,err}$). The curves 314, 316 and 318, on the other hand, demonstrate the effectiveness of the time-weighted approach formulated by (eq-22), (eq-23) and (eq-24). They efficiently and deterministically converge to zero in much shorter duration than those implemented using probability weighted approach.

Figure 8A:
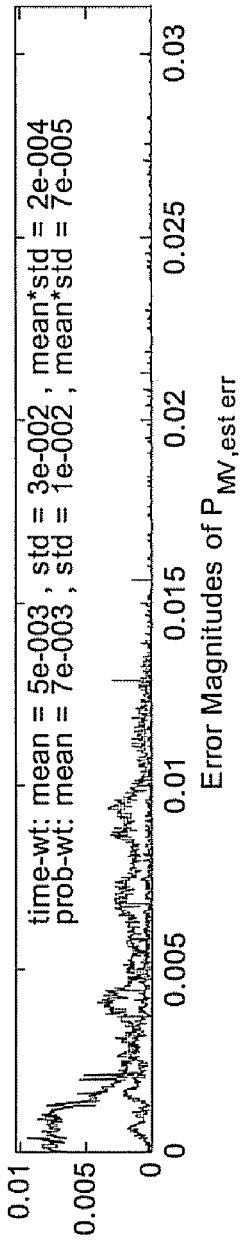
FIGS. 8A-8C show the PDF of error magnitudes of the curves in FIGS. 7A-7C but for 40 samples per unit duration.
Figure 8B:
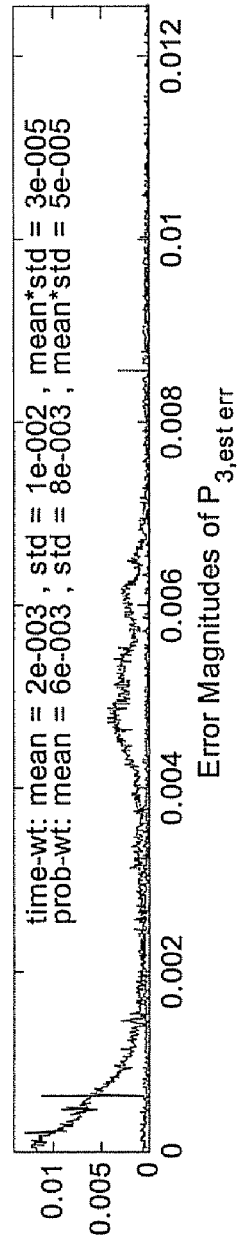
Figure 8C:
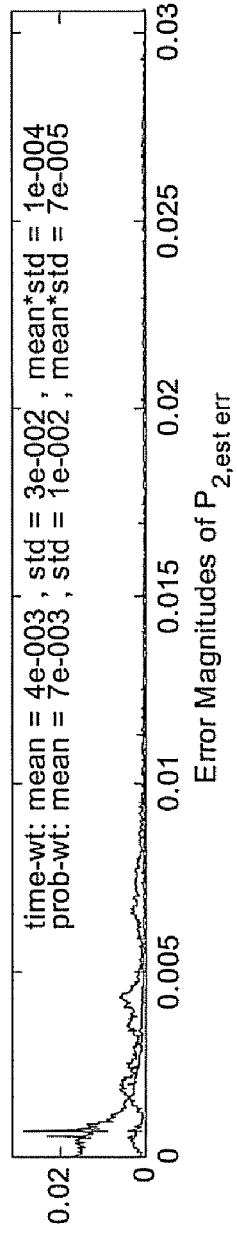

FIGS. 7A-7C and 8A-8C illustrate the probability density function (PDF) of error magnitudes of probability estimates for both the conventional probability weighted approach and the time weighted approach of the present disclosure, for 10 samples per unit duration (FIGS. 7A-7C) and 40 samples per unit duration (FIGS. 8A-8C). Since this time-weighed approach (i.e., direct rounding method) has the behavior of probability error magnitudes converging to zero at the end of each unit duration, a longer unit duration means that the error magnitude will remain larger longer. This is easily shown in the PDF's of the probability error magnitudes in FIGS. 8A-8C (both the means and standard deviation for all three PDF's are smaller than its counterpart in FIGS. 7A-7C and 8A-8C). This is another advantage since the metric of number of samples per unit duration can be used to determine the error magnitude.

It is apparent that the error magnitudes for the probability-weighted approach are larger and spread out widely, whereas for the direct rounding methodology used with the time-weighted of the present disclosure, magnitudes are close to zero and concentrate closely. Both the mean (i.e., the ensemble average of the errors) and the standard deviation (i.e., the spread of the ensemble average of the errors) for the time-weighted approach are smaller than those of the probability-weighted approach. One convenient metric is the product of the mean and standard deviation. For the XYZ combining option, the product metric for the direct rounding approach of the present disclosure is smaller than those of the probability-weighted approach for all three probability estimate errors.

Figure 9A:
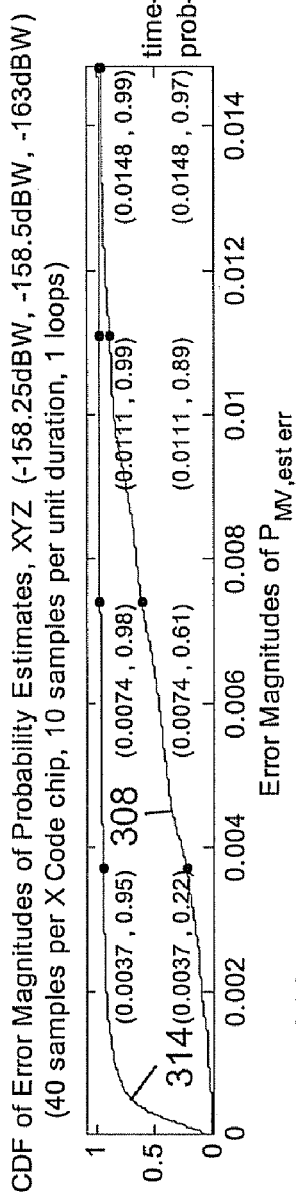
FIGS. 9A-9C illustrate the cumulative distribution function (CDF) of error magnitudes of probability estimates for the probability weighted approach and the time-weighted approach of the present disclosure.
Figure 9B:
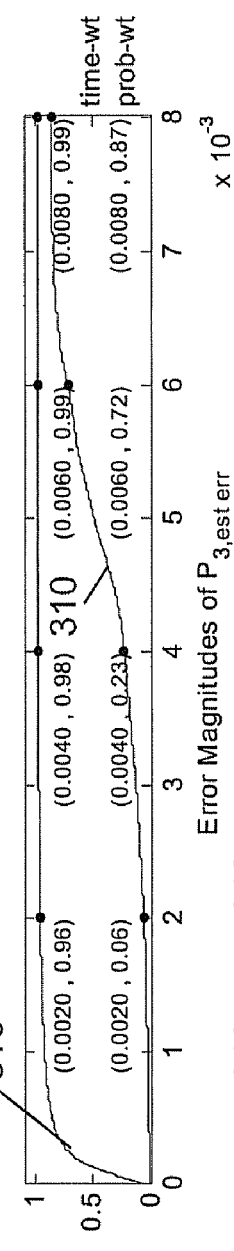
Figure 9C:
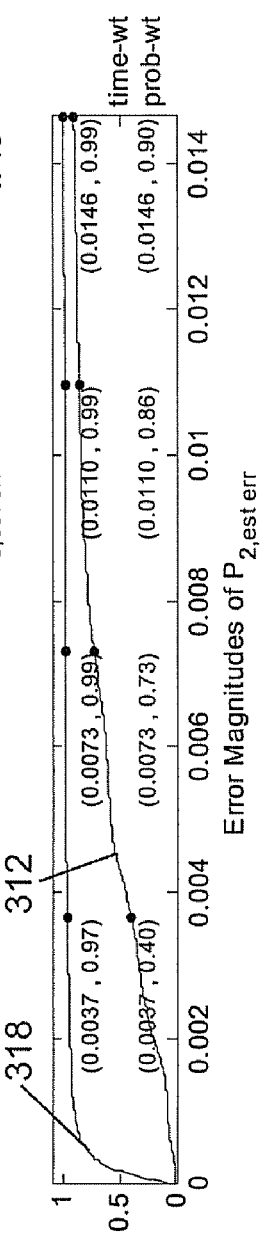

Referring to FIGS. 9A-9C, another related metric that is helpful in appreciating the performance benefits of the time-weighted approach of the present disclosure is the CDF (cumulative distribution function). This provides an overview of the spread of the error magnitudes for both of the probability weighted and time-weighted approaches.

Figure 10A:
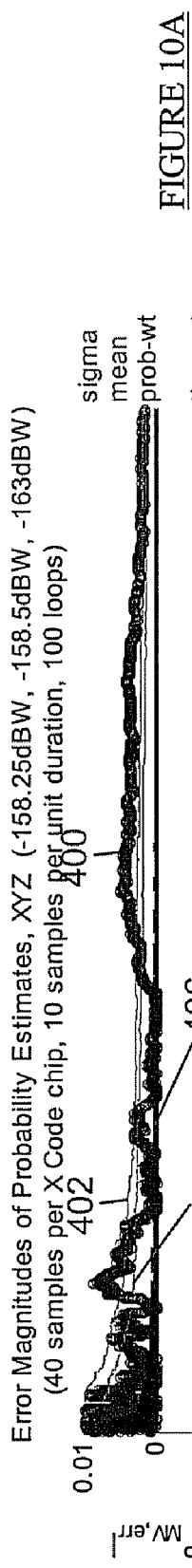
FIGS. 10A-10C show the error magnitudes of the statistical average of 100-loop Monte Carlo run of probability estimates for curves generated by the probability weighted approach, for the sequence MV, sequence 2 and sequence 3, and the single-loop probability estimates for curves generated by the time weighted approach for the same three sequences.
Figure 10B:
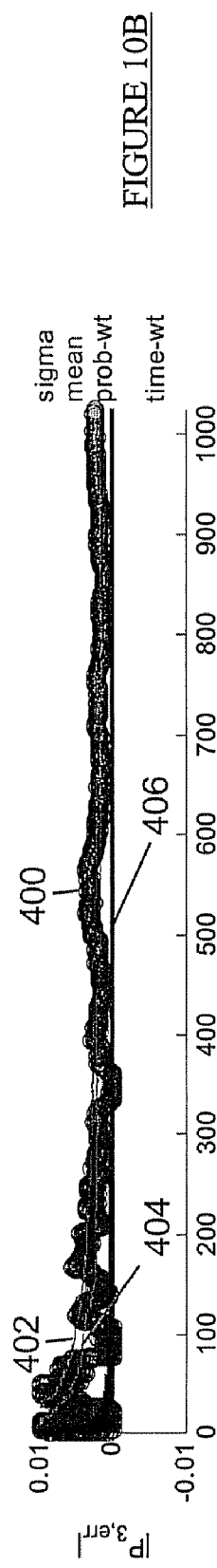
Figure 10C:
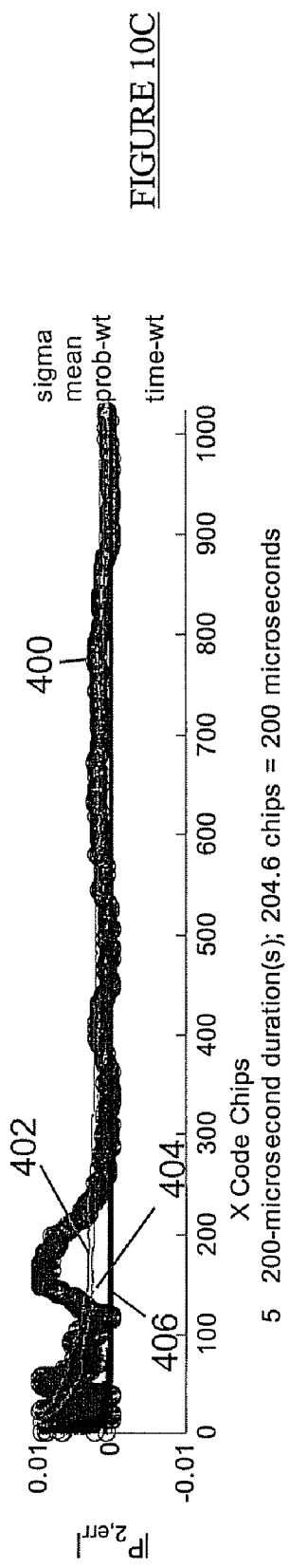

FIGS. 10A-10C provide a 100-loop Monte Carlo result and the time span is one complete X code period. The curves 400 and 406 are for the probability weighted and time-weighted approaches respectively, for the 100th loop error magnitudes. The curves 402 and 404 are for the mean of the 100 loops of error magnitudes and the sigma of the 100 loops of error magnitudes. It can be noted that both mean and sigma curves converge toward zero as time progresses. This is expected. The rate at which they converge gives the authenticity and authenticity period of the URNG. it is apparent that all three error magnitudes for the direct rounding methodology used in the time-weighted approach are considerably smaller than those of the probability-weighted approach.

This system and method of the present disclosure is expected to find use wherever it is necessary to combine three BPSK codes into one code. Any entity involved in the manufacture of satellites used for navigation and ranging purposes for either civil or military purposes including, but not limited to, GPS, WAAS, Galileo, GLONASS, etc., may find the application of the system and methodology of the present disclosure to be highly advantageous. The teachings provided herein may also be applied to other technologies such as radar, sonar, etc. Compared to previously used code combining technologies (i.e., probability weighted Interlace combining), the time-weighted system and method of the present disclosure is even more power efficient, simpler to implement, lower cost, easier to troubleshoot, and provides even better backward compatibility in terms of existing shortest receiver integration time in receivers.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method, implemented by a processor, for time weighted combining of a plurality of binary phase shift key (BPSK) code sequences, the method comprising:
    providing a first sequence of chips of a BPSK code having a first code power;
    providing a second sequence of chips of a BPSK code having a second code power;
    providing a third sequence of chips of a BPSK code having a third code power;
    determining a majority vote (MV) sequence of chips from said first, second and third sequences of chips;
    selecting a specific number of samples from each of said MV sequence of chips, and the two sequences of chips of said first, second and third sequences of chips that have the highest code powers, to form samples in a first unit duration, where the unit duration is able to form a time period that is of a time duration that includes a fraction of one chip if needed, and with the specific numbers of samples selected from each of said MV sequence and said two sequences of chips having the highest code powers being representative of the probabilities of each of said sequences being randomly selected based on their respective gains; and
    further taking into account a number of the samples used for each of the MV sequence of chips and the two highest code power sequences of chips when numbers of samples of each of the MV sequence of chips and the two highest code power sequences of chips are being determined, to form a second unit duration.

2. The method of claim 1, wherein the probabilities of selection of samples from the MV sequence, and said sequence having the highest code power, and said sequence having the second highest code power, are represented by the following formulas:

$$P_{MV} = \frac{2}{\sqrt{G_3} + \sqrt{G_2}} \quad \text{(eq-1)}$$

$$P_3 = \frac{\sqrt{G_3} - 1}{\sqrt{G_3} + \sqrt{G_2}} \quad \text{(eq-2)}$$

$$P_2 = \frac{\sqrt{G_2} - 1}{\sqrt{G_3} + \sqrt{G_2}} \quad \text{(eq-3)}$$

where $G3 \geq G2$.

3. The method of claim 2, wherein said first unit duration is formed when a total number of samples, selected from each of said MV sequence, and said two sequences having the two highest code powers, has been selected, relative to the total number of samples selected, to satisfy probabilities $P_{MV}$, $P_3$ and $P_2$ for equations (eq-1), (eq-2) and (eq-3), respectively.

4. The method of claim 3, further comprising repeating the operations of claim 3 to form a series of unit durations, with each said unit duration comprising a new time multiplexed composite BPSK code.

5. The method of claim 4, further comprising concatenating said first unit duration and all subsequently formed unit durations to form an overall, time multiplexed, composite BPSK code sequence.

6. The method of claim 5, wherein the numbers of selected samples from each of said MV sequence and said two sequences having the two highest code powers are different from said first unit duration to a subsequently formed one of said unit durations.

7. The method of claim 5, wherein a number of samples selected from each of said MV sequence and said two sequences having the two highest code powers to form said first unit duration, is represented by the following formulas, where:

total_$m=m$, wherein $m$ is the number of samples in the $1^{st}$ unit duration (starting $t_0$) (eq-10)

round($m \times P_2$)=the number of samples contributed from sequence 2(the said code sequence of the second highest code power); (eq-11)

round($m \times P_3$)=the number of samples contributed from sequence 3(the said code sequence of the highest code power); and (eq-12)

$m$−round($m \times P_2$)−round($m \times P_3$)=the number of samples contributed from the MV sequence. (eq-13)

8. The method of claim 7, wherein the number of samples contributed from the MV sequence and the two highest power code sequences to form each said subsequent unit duration is represented by the following formulas, where:

total_$m$=total_$m+m$=the total number of samples in all unit durations since $t_0$ including the next unit duration; (eq-14)

round(total_$m \times P_2$)−samples from sequence 2 in all previous unit durations=the number of samples contributed from sequence 2 into the next unit duration; (eq-15)

round(total_$m \times P_3$)−samples from sequence 3 in all previous unit durations=the number of samples contributed from sequence 3 into the next unit duration; (eq-16)

total_$m$−round(total_$m \times P_2$)−round(total_$m \times P_3$)−samples from MV sequence in all previous unit durations=the number of samples contributed from MV sequence into the next unit duration; and (eq-17)

and wherein said first unit duration=total_m,=initialized to m.

9. A method, implemented by a processor, for time weighted combining of a plurality of three binary phase shift key (BPSK) code sequences, comprising:
    providing a first sequence of chips of a BPSK code having a first code power;
    providing a second sequence of chips of a BPSK code having a second code power;
    providing a third sequence of chips of a BPSK code having a third code power;
    determining a majority vote (MV) sequence of chips from said first, second and third sequences of chips;
    forming a time multiplexed composite BPSK composite code sequence by selecting a specific number of samples from each of said MV sequence of chips, and the two sequences of chips of said first, second and third sequences of chips that have the highest code powers, to form samples in a first unit duration, where the first unit duration is able to be form a time duration that includes a fraction of a chip if needed, and with the specific numbers of samples selected from each of said MV sequence and said two sequences of chips having the highest code powers being representative of the probabilities of each of said sequences being randomly selected based on their respective gains;

the probability ($P_{MV}$) of samples from each of said MV sequence, and the probability ($P_3$) of samples from said sequence having the highest code power, and the probability ($P_2$) of samples from said sequence having the second highest code power, being selected are represented by the following formulas:

$$P_{MV} = \frac{2}{\sqrt{G_3} + \sqrt{G_2}} \quad \text{(eq-1)}$$

$$P_3 = \frac{\sqrt{G_3} - 1}{\sqrt{G_3} + \sqrt{G_2}} \quad \text{(eq-2)}$$

$$P_2 = \frac{\sqrt{G_2} - 1}{\sqrt{G_3} + \sqrt{G_2}} \quad \text{(eq-3)}$$

where $G3 \geq G2$; and further taking into account a number of the samples used for each of the MV sequence of chips and the two sequences of chips having the highest code powers when numbers of samples of each of the MV sequence of chips and the two highest code power sequences of chips are being determined, to form a second unit duration.

10. The method of claim 9, wherein said first unit duration is formed when a total number of samples selected from each of said MV sequence, and said two sequences having the two highest code powers, has been selected, relative to the total number of samples selected, to satisfy probabilities $P_{MV}$, $P_3$ and $P_2$ for equations (eq-1), (eq-2) and (eq-3), respectively.

11. The method of claim 10, further comprising repeating the operations set forth in claim 10 to form a series of unit durations, with each said unit duration comprising a new time multiplexed composite BPSK code.

12. The method claim 11, further comprising concatenating said first unit duration, said second unit duration and all subsequently formed unit durations to form an overall, time multiplexed, composite BPSK code sequence.

13. The method of claim 12, wherein the numbers of selected samples from each of said MV sequence and said two sequences having the two highest code powers are different from said first unit duration to the second unit duration.

14. The method of claim 13, wherein a number of samples selected from each of said MV sequence and said two sequences having the two highest code powers to form said first unit duration, is represented by the following formulas, where:

total_$m$, wherein $m$ is the number of samples in the $1^{st}$ unit duration (starting $t_0$) (eq-10)

round($m \times P_2$)=the number of samples contributed from sequence 2(the said sequence of the second highest code power); (eq-11)

round($m \times P_3$)=the number of samples contributed from sequence 3(the said sequence of the highest code power); and (eq-12)

$m$−round($m \times P_2$)−round($m \times P_3$)=the number of samples contributed from the majority vote MV sequence. (eq-13)

15. The method of claim 14, wherein the number of samples contributed from the MV sequence and the two highest code power sequences to form each said subsequent unit duration is represented by the following formulas, where:

total_$m$=total_$m$+$m$=the total number of samples in all unit durations since $t_0$ including the next unit duration; (eq-14)

round(total_$m \times P_2$)−samples from sequence 2 in all previous unit durations=the number of samples contributed from sequence 2 into the next unit duration; (eq-15)

round(total_$m \times P_3$)−samples from sequence 3 in all previous unit durations=the number of samples contributed from sequence 3 into the next unit duration; (eq-16)

total_$m$−round(total_$m \times P_2$)−round(total_$m \times P_3$)− samples from MV sequence in all previous unit durations=the number of samples contributed from MV sequence into the next unit duration; (eq-17)

and wherein the first unit duration 32 total_m,=initialized to m.

16. An apparatus for performing a direct rounding operation to time multiplex combine a plurality of binary phase shift key (BPSK) code sequences to obtain a series of unit durations, wherein said series of unit durations represents an overall time multiplexed BPSK code sequence, and wherein the BPSK code sequences include a first sequence of chips of a BPSK code having a first code power, a second sequence of chips (sequence 2) of a BPSK code having a second code power, a third sequence of chips (sequence 3) of a BPSK code having a third code power, and a majority vote (MV) sequence of chips determined from said first, second and third sequences of chips; the apparatus comprising a first accumulator (accumulator MV) for counting a number of code samples selected from said MV sequence in all preceding unit durations;

a second accumulator (accumulator 2) for counting a number of samples obtained from said sequence 2 in all preceding unit durations;

a third accumulator (accumulator 3) for counting a number of samples from said sequence 3 in all preceding unit durations;

a first rounding operator for computing $s_2$, which represents a total number of samples contributed from said sequence 2 to be placed in an immediate subsequent unit duration and those samples from said sequence 2 that have been placed in all preceding unit durations;

a second rounding operator for computing $s_3$, which represents a total number of samples contributed from said sequence 3 to be placed in the immediate subsequent unit duration and those samples from said sequence 3 that have been placed in all the preceding unit durations;

a summing device for taking the count of all samples in all of said unit durations determined hitherto, subtracting the number of said sequence 2 samples placed in said all unit durations hitherto, subtracting the number of said sequence 3 samples placed in all of said unit durations determined hitherto, subtracting the number of said sequence MV samples placed in all of said unit durations determined hitherto except the most immediate subsequent unit duration, to produce a count $s_{MV}$ of MV sequence samples to be placed in said subsequent unit duration;

a time multiplexing logic subsystem adapted to select a number of samples from each of said MV sequence, said sequence 2 and said sequence 3, in accordance with said count $s_{MV}$ of said MV sequence samples, said count $s_2$ of sequence 2 samples and said count $s_3$ of sequence 3 samples.

17. The apparatus of claim 16, wherein said first rounding operator implements an equation:

round(total_$m \times P_2$)

where, "total_m" is the total number of samples previously taken from said MV sequence, said sequence 2 and said sequence 3; and where "$P_2$" is the probability of selecting a sample from said sequence 2, based on its code power.

18. The apparatus of claim 16, wherein said second rounding operator implements an equation:

round(total_$m \times P_3$)

where, "total_m" is the total number of samples previously taken from said MV sequence, said sequence 2 and said sequence 3; and where "$P_3$" is the probability of selecting a sample from said sequence 3, based on its code power.

19. The apparatus of claim 16, wherein the first accumulator is set to zero before determining a first one of said unit durations.

20. The apparatus of claim 16, wherein each of said second and third accumulators are set to zero before determining a first one of said unit durations.

* * * * *